United States Patent [19]

Miller

[11] Patent Number: 4,744,335

[45] Date of Patent: May 17, 1988

[54] SERVO TYPE COOLING SYSTEM CONTROL

[75] Inventor: Paul D. Miller, Huntsville, Ala.

[73] Assignee: Chrysler Motors Corporation, Highland Park, Mich.

[21] Appl. No.: 80,840

[22] Filed: Aug. 3, 1987

[51] Int. Cl.⁴ .............................................. F01P 7/16
[52] U.S. Cl. ................................ 123/41.1; 123/41.08; 236/34.5; 251/30.05; 251/44
[58] Field of Search ............... 123/41.02, 41.08, 41.09, 123/41.1, 41.72; 236/34.5; 251/30.05, 44

[56] References Cited

U.S. PATENT DOCUMENTS

| | | | |
|---|---|---|---|
| 2,573,369 | 10/1951 | Snoddy | 251/30.05 |
| 3,300,175 | 1/1967 | Kozel | 251/30.05 |
| 3,698,682 | 10/1972 | Berning et al. | 251/44 X |
| 4,201,362 | 5/1980 | Nishimi et al. | 251/30.05 X |
| 4,475,485 | 10/1984 | Sakakibara et al. | 123/41.1 X |
| 4,484,541 | 11/1984 | Yokoyama | 123/41.1 |
| 4,537,158 | 8/1985 | Saur | 123/41.1 |
| 4,545,333 | 10/1985 | Nagumo et al. | 123/41.02 |
| 4,616,599 | 10/1986 | Taguchi | 123/41.1 |

FOREIGN PATENT DOCUMENTS

| | | | |
|---|---|---|---|
| 79756 | 10/1976 | Canada | 251/44 |
| 2742 | of 1874 | United Kingdom | 251/44 |

Primary Examiner—Tony M. Argenbright
Attorney, Agent, or Firm—Kenneth H. MacLean, Jr.

[57] ABSTRACT

An improved control for a liquid coolant type cooling system of an automotive internal combustion engine including a coolant pressure powered servo valve which is responsive to a control pressure generated in accord with an electrical control signal. The electrical signal is generated in accord with several engine operative and cooling related inputs.

6 Claims, 3 Drawing Sheets

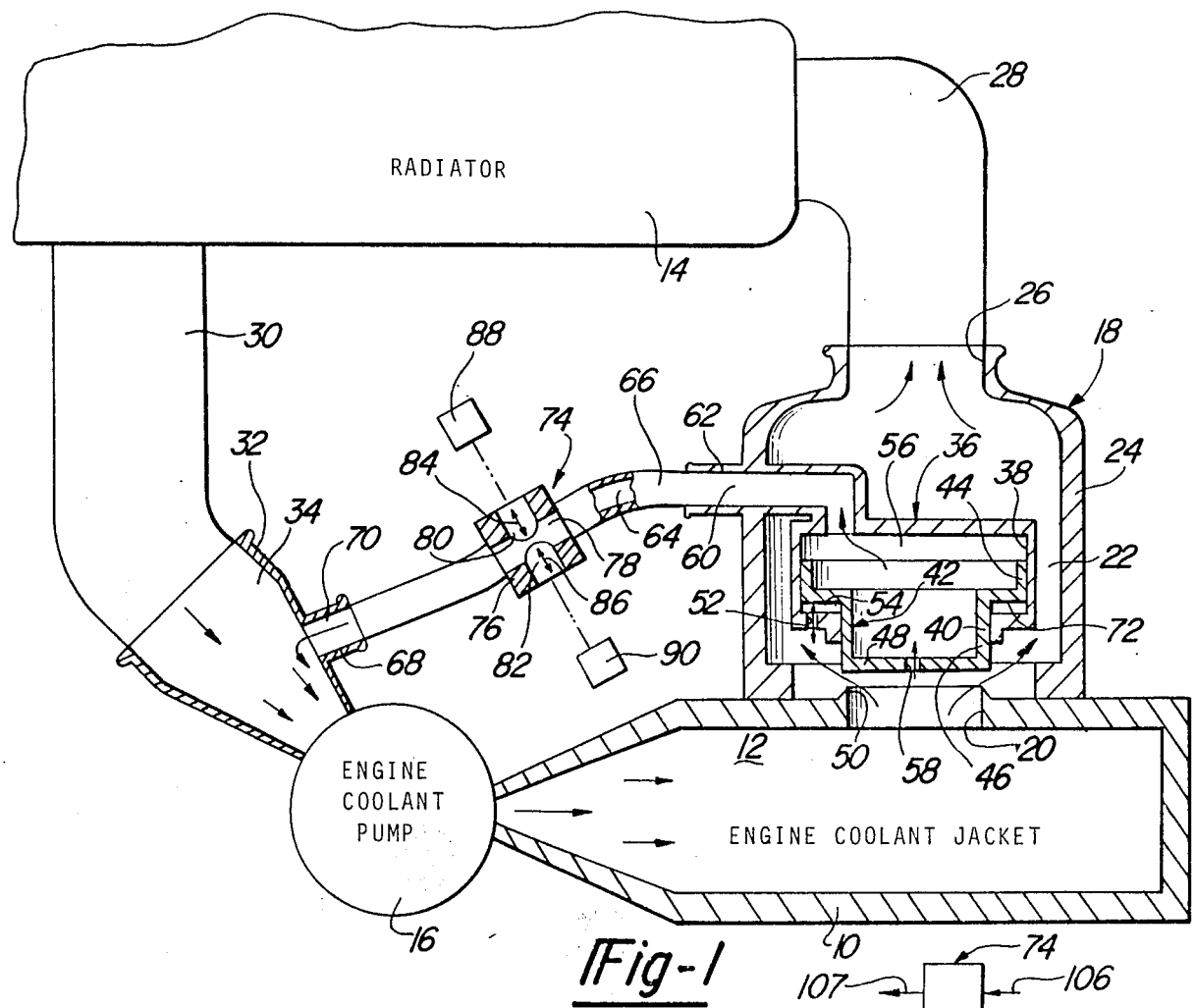
Fig-1
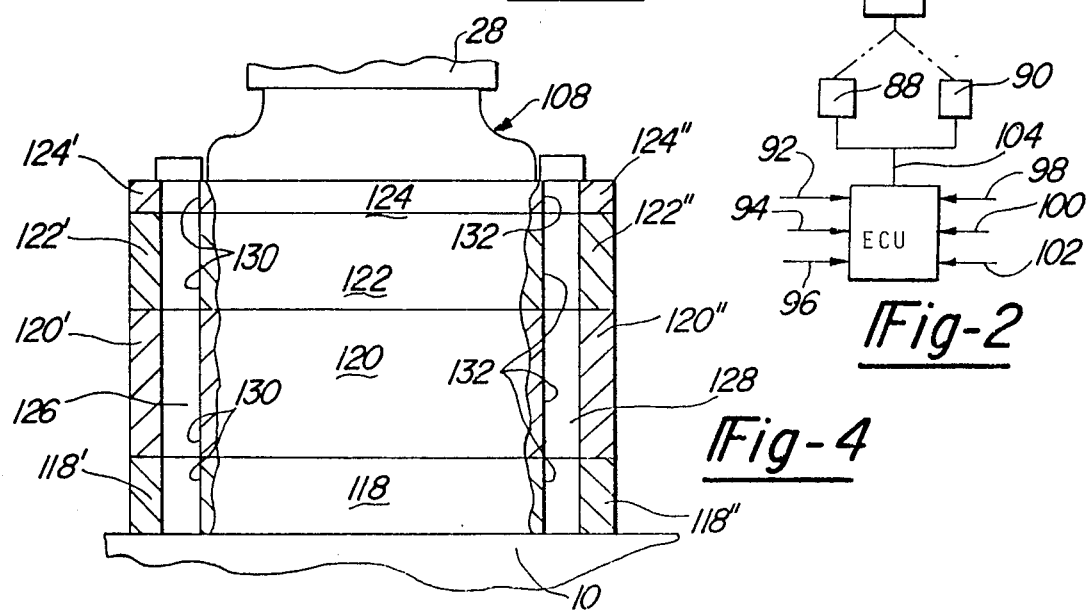
Fig-2
Fig-4

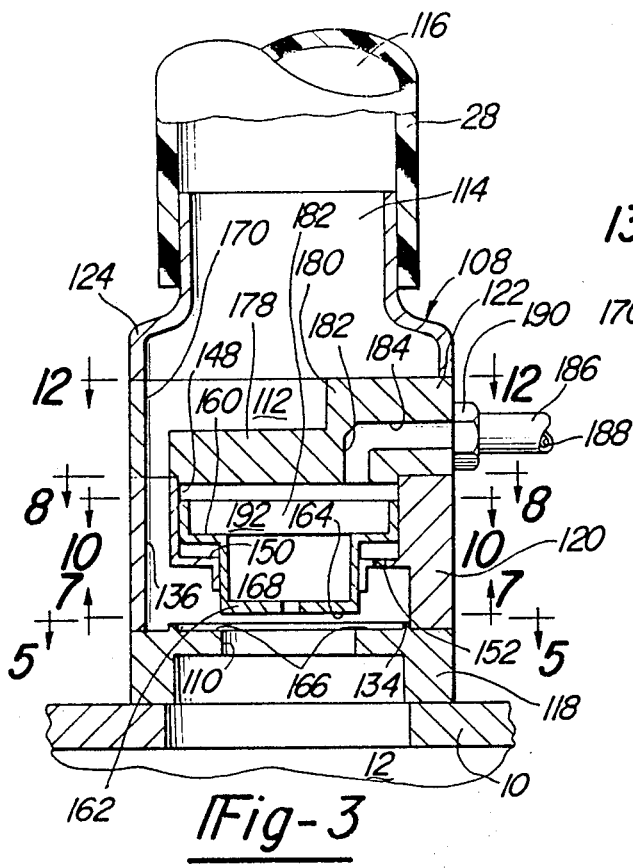
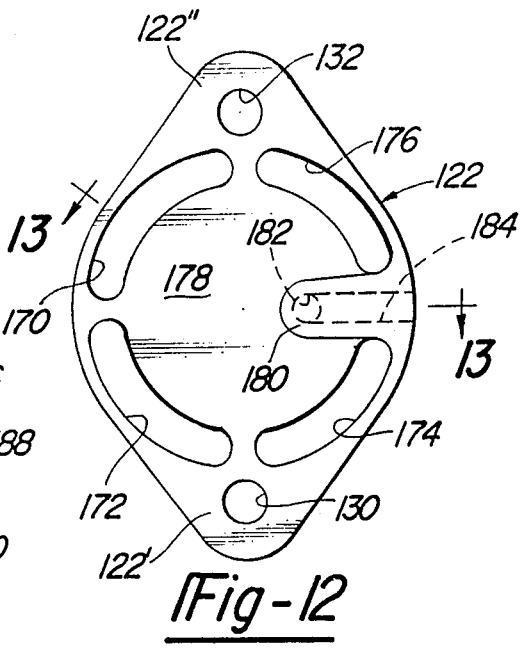
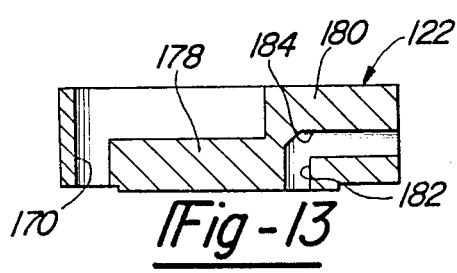
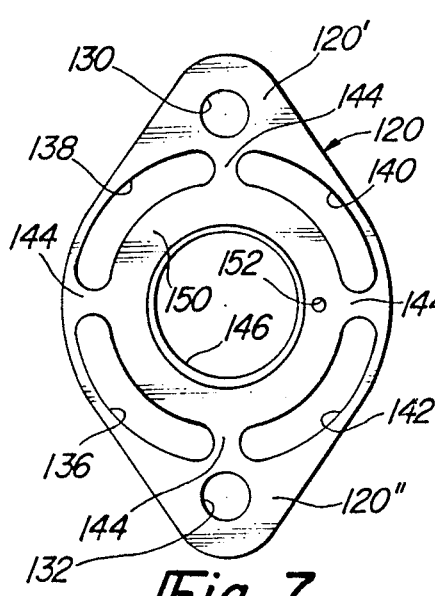
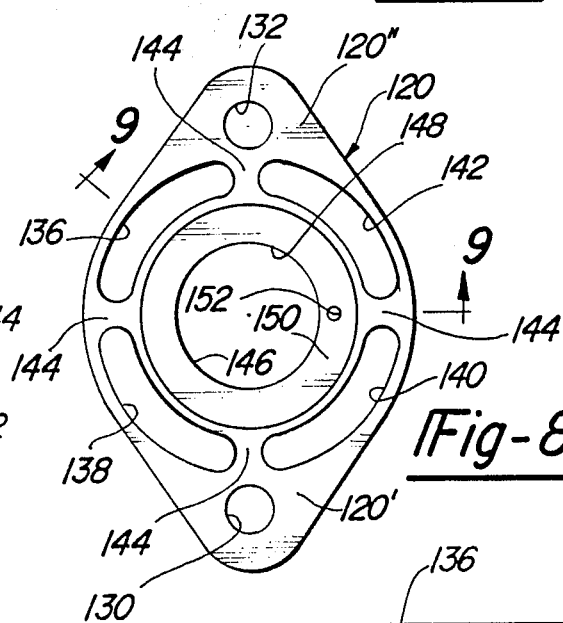
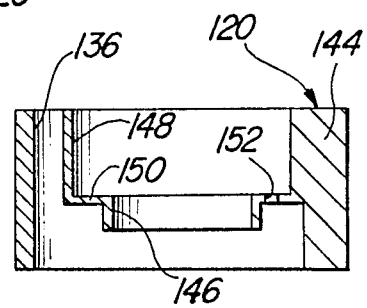

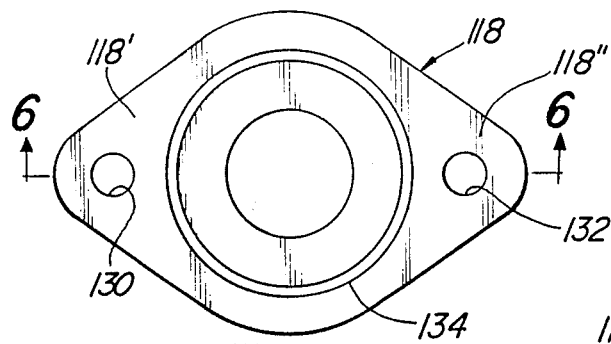
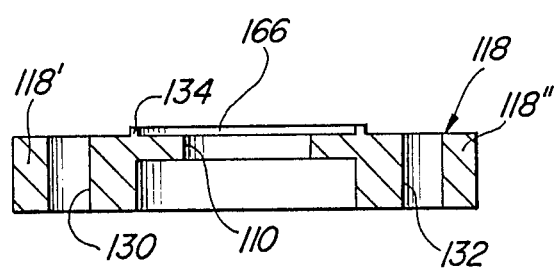
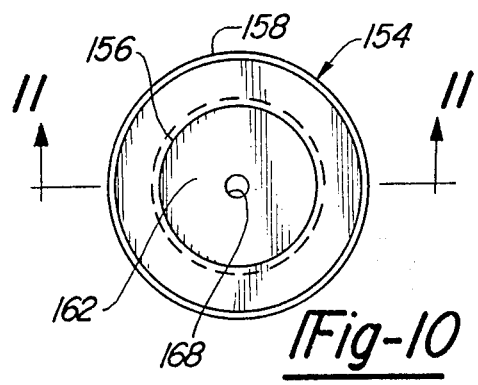
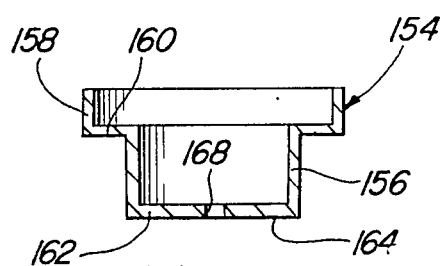

SERVO TYPE COOLING SYSTEM CONTROL

BACKGROUND OF THE INVENTION

1. Field of the Invention

This application relates to an improved automotive liquid cooling system for regulating the operating temperature of an internal combustion engines as and specifically a cooling system control which responds to several engine and cooling system characteristics or parameters and utilizes a coolant pressure powered or servo type valve control.

2. Description of Related Art

The typical automotive cooling system for an internal combustion engine includes a liquid coolant filled radiator and engine "water" jacket, a radiator cap to pressurize the radiator, a coolant pump and a thermostat. Basically, the thermostat is designed to either prohibit coolant flow in the closed mode or to allow coolant flow between the engine or radiator in the open mode. This cooling system has been standard for a great many years and it has proved to be relatively reliable and effective.

In the typical cooling system as described above, the well known thermostat responds directly to coolant temperature changes and uses the expansive forces generated by an enclosed thermally expandable material to open the thermostat. Unfortunately, this expandable material may leak or the thermostat may fail to open for some other reason. When the thermostat does not open, the engine will usually overheat and become inoperative.

In addition to the above described problem with a prior cooling system, the typical expansion type thermostat responds only to one engine related operating condition or parameter, namely the coolant temperature at the engine outlet. It is desirable to provide a cooling system which controls engine temperature in accord with several engine and cooling system conditions or parameters. Consequences of the aforedescribed limitations of this type of cooling system are: somewhat undesirable driveability in certain circumstances, less than optimal combustion chamber temperatures, engine knocking under certain conditions, relatively slow engine warmup, decreased engine efficiency and decreased performance.

There have been previous attempts to overcome problems with the conventional cooling system. In U.S. Pat. Nos. 4,475,485 and 4,537,158, cooling systems utilizing thermostats controlled electrically are disclosed. In the '485 patent, a magnetically driven valve is controlled by a micro computer or electronic control unit (ECU). In the '158 patent, a thermally responsive thermostat is used but additional apparatus is added to adjust the valve opening characteristics. Resultantly, a dual range cooling system is achieved. The U.S. Pat. No. 4,484,541 discloses a cooling system using a thermostat which is powered by vacuum pressure. The U.S. Pat. No. 4,545,333 discloses a cooling system with a vacuum pressure controlled thermostat in which an electronic control regulates vacuum pressure. A radiator bypass is also disclosed.

SUMMARY OF THE INVENTION

This application concerns an improved cooling system and control for an automotive internal combustion engine or ICE including a typical pressurized type radiator, a pump, and a coolant filled engine jacket. The improvement includes a coolant pressure powered servo type valve controlled electrically which replaces the conventional thermostat. The improved valve and control regulates coolant flow and even blocks coolant flow from the engine jacket to the radiator in response to several operational engine and cooling conditions or parameters. These parameters may include: ambient temperature, coolant inlet temperature, coolant outlet temperature, combustion chamber temperature, selective vehicle heater inputs and the manifold absolute pressure or MAP (relates to engine loading).

Specifically, this application concerns an engine coolant flow control system utilizing a servo powered piston-like valve to regulate coolant flow progressively from a zero flow condition to a full open flow condition. The control mechanism includes a servo control passage which transmits a small bypass flow of coolant directly between the engine jacket and the engine pump inlet. The bypass flow is regulated by a selective opening and closing of an electrically actuated control valve. Resultantly, coolant pressure upstream of this control valve may be increased or decreased respectively by either restricting or unrestricting the flow passage. The servo powered piston-like valve itself has a reciprocally mounted piston with a stepped configuration, in other words, a small dimensioned end portion and a larger dimensioned end portion. One end of the piston is exposed to pressure of the control passage while the other end is subjected to engine jacket pressure. A balancing of coolant pressure forces on the piston establishes a desired positioning of the piston valve for a proper coolant flow between the engine and radiator.

Therefore, an object of this invention is to provide an improved engine cooling system in which an electrical control signal is generated in response to several engine and cooling system conditions or parameters, the signal is applied to an electrically responsive member to produce a desired coolant control pressure and the control pressure is then applied to a coolant pressure powered or responsive flow control device for regulating coolant flow between an engine coolant jacket and radiator.

A further object of the invention is to provide an improved cooling system control including a servo type, coolant pressure powered valve which is infinitely variably positioned relative to a flow opening for regulating coolant flow between an associated engine and radiator, the variable position being produced by a coolant pressure force balance on the valve partially generated by an electrically actuated control device in a servo control, bypass passage.

Still further objects and advantages of the subject cooling system control will be more readily apparent after a reading of the following detailed description of a preferred embodiment, reference being had to the drawings which illustrate the embodiment of the system and components thereof.

IN THE DRAWING

Other objects, features and advantages of the present invention will become more fully apparent from the following detailed description of the preferred embodiment, the appended claims and in the accompanying drawings in which:

FIG. 1 is a somewhat schematic view of the subject engine cooling system and control;

FIG. 2 is a schematic view of an electrical control element;

FIG. 3 is an elevational, sectioned view of a preferred embodiment of the servo powered valve which is shown somewhat schematically in FIG. 1;

FIG. 4 is an elevational, partially sectioned view of the valve shown in FIG. 3 taken normally to the view of FIG. 3;

FIG. 5 is a planar view of a part of the valve in FIG. 3 looking in the direction of arrows 5—5 in FIG. 3;

FIG. 6 is a sectioned view of the part shown in FIG. 5 taken along section line 6—6 in FIG. 5;

FIGS. 7 and 8 are planar views of another part of the valve shown in FIG. 3 looking in the direction of the arrows 7—7 and 8—8 in FIG. 3;

FIG. 9 is a sectioned view of the part shown in FIG. 8 taken along section line 9—9 in FIG. 8;

FIG. 10 is a planer view of another part of the valve looking in the direction of arrows 10—10 in FIG. 3;

FIG. 11 is a sectioned view of the part shown in FIG. 10 taken along section line 11—11 in FIG. 10;

FIG. 12 is a planar view of a part of the valve shown in FIG. 3 looking in the direction of arrows 12—12 in FIG. 3; and FIG. 13 is a sectioned view of the part of valve shown in FIG. 12 taken along section line 13—13 in FIG. 12.

DETAILED DESCRIPTION OF A PREFERRED EMBODIMENT

In FIG. 1, an improved cooling system and control is somewhat schematically illustrated. The purpose of the improved cooling system is to transfer heat from an automobile's internal combustion engine to atmosphere in an effective manner to promote desirable engine operation. Some components of the cooling system shown in FIG. 1 are conventional as are currently being used in modern automobiles. For example, the typical internal combustion engine includes an engine block which among other things defines hollow spaces or enclosures adapted to have liquid coolant pumped therethrough to receive heat from the engine. These enclosures or coolant passages are interconnected and are collectively referred to as the engine water jacket or just jacket whether or not water is used as the coolant. The engine jacket 10 and the coolant filled passages 12 are shown somewhat schematically in FIG. 1. Another typical or conventional component of the cooling system shown in FIG. 1 is the heat exchanger or radiator 14 (only partially shown). A third conventional cooling system component is the engine driven water or coolant pump 16. The pump 16 can be driven or powered directly by the engine or in an alternate manner such as by an electric motor (not illustrated). The components 10-16 are fluidly connected in substantial series flow relation to one another by various hoses and fittings identified hereinafter.

During a warmup mode of engine operation, there should be no substantial flow of coolant between the passages 12 of engine jacket 10 and the radiator 14. Obviously, during this warmup mode the heat generated by combustion of fuel in the engine is needed to increase the temperature of the basic engine components, the lubricating oil and the coolant to a desirable operative level. An engine operating at a desirable temperature level will exhibit better driveability and be more efficient.

A typical prior art thermostat is driven between closed and opened operative conditions by the thermal expansion of an enclosed expandable material. Opening of the thermostat begins at a specific start-to-open temperature of the coolant in the engine jacket. The thermostat is completely opened by only a small increase in coolant temperature. Thus, this type of thermostat is relatively inflexible in controlling engine cooling.

The aforedescribed simple cooling system control using a thermostat obviously works. However, as the operating environment of the engine changes, the cooling system control should automatically adjust to changing conditions and generate an engine operating temperature proper to maximize engine efficiency and performance. The abovedescribed thermostat responds only to a coolant temperature change over a quite small temperature range. The improved cooling system control accepts several engine and cooling system operative conditions or parameters to select an optimum engine temperature for the prevailing conditions.

The improved cooling system control illustrated in FIG. 1 includes a coolant pressure driven and servo controlled valve 18 having an inlet opening 20 leading from the engine passages 12 to a valve interior 22 formed by a thin walled enclosure 24. The enclosure 24 defines an outlet opening 26 operatively connected to the radiator 14 by a conduit or hose 28. The coolant flow circuit from the radiator 14 to the pump 16 and back to engine coolant passages 12 is completed by a hose 30 and an inlet fitting 32 of the pump 16. Fitting 32 defines inlet passage 34 direct coolant flow to the pump 16.

The enclosure 24 includes an interior portion 36 which defines a step configured cylinder with a relatively large diameter portion 38 and a smaller diameter portion 40, both coaxially with one another. A coolant pressure driven main flow control valve 42 is supported for reciprocation within the enclosure 36 and is also step configured. Specifically, the valve 42 operates much as a piston and has a generally cup shaped configuration. The piston valve 42 has a larger diameter cylindrical portion 44 and a smaller diameter cylindrical portion 46. The dimensions of the cylindrical portions 44,46 conform to the dimensions of cylinders 38 and 40 respectively. Accordingly, the piston valve 42 reciprocates in the stepped cylinder. The piston valve 42 has a lower end 48 which projects away from the enclosure 36 and is spaced with respect to the inlet opening 20. Specifically, the opening 20 is encircled by a raised valve seat portion 50. When the piston valve 42 moves downward to an extreme position from the raised position shown in FIG. 1, the end portion 48 of the valve 42 seats against the valve seat 50 to substantially block coolant flow into valve 18. When piston valve moves upward from the seat 50, the restriction to flow progressively decreases. A small two way bleed passage 52 in the wall of the enclosure 36 communicates interior space 22 with a space 54 formed between the piston valve 42 and the cylindrical portions 44, 46 of so as not to inhibit reciprocation of the piston valve 42.

The piston valve 42 can be infinitely positioned relative to the seat 50 and inlet 20. As previously mentioned, the piston valve 42 is servo driven or powered. Accordingly, a servo control chamber 56 is formed within enclosure 36 about the upper portion of the piston valve 42. The chamber 56 always communicates with coolant adjacent the inlet opening whether or not the piston valve 42 is in an open or closed position. A small bleed orifice 58 extends through the end 48 of piston valve 42 and is aligned with the inlet opening 20 to insure this communication.

The servo control chamber 56 connects with an outlet passage 60 in the form of a fitting 62 of enclosure portion 36. The passage 60 extends through enclosure 24. A servo control passage 64 including passage 60 is formed by a bypass conduit or hose 66 and is connected at its other end to a fitting 68. Fitting 68 is a part of pump inlet fitting 3 and defines a passage 70 communicating with inlet passage 34. Accordingly, the servo control passageway which includes passages 60, 66, 70 and 34 directs the bypass flow of coolant between the engine passages 12 and the pump inlet 34. Because of the restriction to flow of small bleed orifice 58, the flow is relatively insignificant.

Opposed pressure forces act on opposing ends of the piston valve 42. A pressure balance controls or sets the position of the piston valve 42 relative to the inlet 20 and seat 50. A first pressure force is exerted upwardly on the lower end 48 of piston valve 42 which tends to open the piston valve. A second pressure force is exerted downwardly against the upper end surfaces of the piston valve 42 which tends to close the piston valve. Because of the stepped construction, the area of the upper end is larger than the area of the lower end. Accordingly, changes in the second pressure force readily control movement of piston valve 42. The downwardly facing annular surface 72 of piston valve 42 is not immediately subjected to pressure changes due to relatively limited communication with the interior 22 provided by the small passage 52.

The coolant pressure within the servo control chamber 56 is regulated by selectively applied flow restrictions of the control passage 64 by activation of an electric servo control valve 74. Servo control valve 74 is located between control chamber 56 and the passage 70. In FIG. 1, the valve 74 is shown at a midpoint of the servo control conduit 66. With only one exception, there will always be a flow of coolant through bleed opening 58, chamber 56 and passage 64 of conduit 66 because of the effects of pump 16. The exception is when the engine is being warmed up. During warmup, the servo valve 74 is closed for an extended period.

In the preferred embodiment, the form of the servo valve 74 is shown schematically and represents an electrically pulsed device which produces desired flow restrictions for increasing or decreasing coolant pressure upstream of valve 74. Specifically, the valve 74 includes a body 76 with a flow passage 78 therethrough. A pair of aligned gate valves 80 and 82 are mounted in body 76 so as to be pulsed relative to one another. In other words, the gate valves move toward and away from one another at a selective frequency as indicated by arrows 84 and 86 respectively. This pulsed movement may be produced by electrical activation of an associated solenoid means or a pair of solenoids 88 and 90. The facing adjacent ends of the gates 80, 82 are arranged in the body so that the coolant flow passes therebetween.

Preferably, the frequency of the electrical signal to the solenoids is varied to control the flow restriction of valve 74. When no signal is received by solenoids 88,90, the valve is so constructed to be fully open. With the gates 80, 82 apart, the pressure in chamber 56 is decreased due to the suction of the pump 16. Resultantly, piston valve 42 is moved by the resultant upward pressure balance to a fully open position. If power to the solenoids of the servo valve 74 is disrupted, the cooling system insures maximum cooling of the engine. When the solenoid activators are rapidly pulsed, the restriction to flow through the passage 64 is relatively great and the pressure in control chamber is increased. This will cause the piston valve 42 to move downward toward seat 50 to a more closed position. The position of valve 42 can be changed by varying the frequency of the signal to the solenoids 88, 90. When the frequency of the signal exceeds the capacity of the solenoid to respond rapidly enough, the valve 74 is essentially closed and the pressure in chamber 56 increases. The increased downward pressure balance then moves the piston valve 42 into a closed position.

It has been explained that the servo valve 74 is electrically controlled and more specifically responds to a change in frequency of the electric signal. One of the advantages of the subject cooling control is that several engine and cooling system operative conditions or parameters may be utilized to influence engine cooling. In FIG. 2, a schematic view shows electrically activated valve 74 or more specifically the solenoids 88,89 connected to an electronic control unit or ECU. The ECU is essentially a dedicated computer which receives a number of data inputs, computes and selects a desirable response from a data bank relating to engine performance and generates an appropriate output, in this case a signal having a desired frequency. The inputs to the ECU which are currently believed to be appropriate are: an ambient temperature input 92; an engine outlet coolant temperature input 94; an engine inlet coolant temperature input 96; a combustion temperature input 98; a manifold absolute pressure (MAP) input 100; and an operator selective heater control input 102. There may be other inputs which are helpful in the selection of an optimum engine temperature. Also, there may be multiple outputs from the ECU other than the frequency signal output 104 to the solenoids 88,90 of valve 74. Examples of other useful outputs are: a control signal for an electric fan; a control signal for a compartment heater valve; a signal for a temperature indicating gage; and a control signal for an electrically powered water or coolant pump. In FIG. 2, the lines 106 and 107 represent the coolant flow through the valve 74 in the direction of the arrows.

So far, the improved cooling system shown in FIGS. 1 and 2 and the operation thereof have been discussed is detail. FIGS. 3-13 relate more specifically to a preferred embodiment of the servo driven or controlled valve component 18 of the system. In FIGS. 3 and 4, a specific servo controlled valve 108 is shown in section. The valve 108 attaches to portions of the engine coolant jacket 10 or the like and has an inlet opening 110 to the interior 112 of the valve 108. At an upper end of the valve, an outlet opening or passage 114 extends from the interior 112 and is shown attached to the hose 28 of FIG. 1. Hose 28 defines a main flow passage 116 to the radiator 14 of FIG. 1.

As is evident from FIGS. 3 and 4, the valve 108 is constructed by stacking or overlying several plate-like members in sealed relation to one another. From the inlet end to the outlet end (from lower to upper in FIGS. 3 and 4), the plates are as follows: a servo valve inlet plate 118; a servo valve housing 120; a servo chamber forming plate 122; and on outlet forming member 124. The plates are secured together in sealed relation to one another by elongated fasteners 126 and 128 which extend through the plates. As shown in FIG. 4, the plates are configured with outwardly projecting and diametrically oppositely placed flanges 118', 120', 122', 124' and 118", 120", 122", 124" respectively. These flanges have aligned holes 130 and 132 through which fasteners 126 and 128 extend.

In FIGS. 5 and 6, separate views of the inlet forming plate or member 118 with inlet aperture or passage 110 are illustrated. An annularly configured and upwardly raised portion 134 is for the purpose of centering members 118 and 120 with respect to one another as best shown in FIG. 3.

In FIGS. 7, 8 and 9, separate viewed of the servo valve housing member 120 are illustrated. FIG. 7 is a planar view looking in an upward direction from inlet 110 in FIG. 3. FIG. 8 is a planar view looking in a downward direction from outlet 114 in FIG. 3. Member 120 has a plurality of axially directed coolant flow passages 136, 138, 140 and 142 formed therethrough. The passages 136-142 are circumferentially arranged and separated one from another by solid portions 144. A stepped cylindrical bore is formed within the circle of the passages 136-142. Specifically, the stepped bore includes a small diameter bore 146 and a coaxially aligned larger diametered bore 148. The two bores are connected by a radially extending annular wall 150. A small vent opening 152 which extends through the wall 150 corresponds to vent opening 52 in FIG. 1.

In FIGS. 10 and 11, a servo driven flow control valve or piston valve 154 in the general shape of a piston is shown which corresponds to the piston valve 42 in FIG. 1. The piston valve 154 is of thin walled construction and is step configured with dimensions corresponding to the dimensions of the step configured bores 146, 148 in member 120. Thus, the valve has a smaller diameter end portion 156 and a larger diameter portion 158. The portions 156 and 158 are connected by a radially extending wall 160. The piston valve 154 has a lower end wall 162 and an open upper end portion. In FIG. 3, a downwardly facing surface 164 of end wall 162 is in spaced relation to an upper surface 166 of inlet member 118. Movements of piston valve 154 and its end surface 164 relative to the surface 166 of member 118 regulates coolant flow through the inlet opening 110 thereof. Finally, the piston valve 154 has a bleed aperture or orifice 168 extending therethrough which corresponds to the orifice 58 in FIG. 1.

In FIGS. 12 and 13, a separate view of the servo chamber forming member 122 is shown. FIG. 12 is a planar view looking downward from the outlet portion 124 in FIG. 3. Member 122 has four circumferentially arranged flow passages 170, 172, 174 and 176 which are aligned respectively with the passages 136-142 in member 120 over which member 122 lies. The central portion within the passages 170-176 consists of an end wall 178 which has a raised portion 180 to provide room for an axially directed passage 182 partially through the member 122 and a radially directed passage 184 connected to passage 182. The interconnected passages correspond to the passage 60 in FIG. 1. The radial passage 184 extends to the outer side surface of the member 122 and is adapted to be sealingly connected to a servo control conduit 186 partially shown in FIG. 3. Conduit 186 forms a servo control passage 188. Conduit 186 and passage 188 correspond to conduit 66 and passage 64 in FIG. 1. The conduit is sealingly attached to member 122 by a fitting including nut 190 shown in FIG. 3.

In FIGS. 3, 12 and 13, it is revealed that the overlying members 122 and 120 cooperate to form a servo control chamber 192 above the piston valve 154. In fact, the piston valve 154 forms a movable lower wall of the chamber 192. Chamber 192 correspond to the chamber 56 shown in FIG. 1.

The previous detailed explanation of the preferred embodiment shown in FIGS. 3-13 primarily related to structural aspects of the servo driven or powered valve. However, it should be clear from the entire description how the embodiment functions in the cooling system described with relation to FIGS. 1 and 2. The preferred embodiment of FIGS. 3-13 functions in the same manner as the embodiment of FIG. 1. In either case, modifications of the structure may be made which still would fall under the coverage of the following claims.

I claim:

1. A cooling system for an internal combustion engine using a liquid coolant within an engine coolant jacket where it receives heat from the engine to be subsequently transferred to the atmosphere, comprising: a radiator fluidly connected to the coolant jacket for receiving coolant therefrom, for transferring heat to air flowing therethrough and for returning cooled coolant back to the coolant jacket; pump means having a pressurized inlet and a higher pressurized outlet for passing coolant from the coolant jacket to the radiator and subsequently back into the coolant jacket; fluid valve means between the coolant jacket and the radiator for regulating the flow of coolant therebetween, the valve means including a housing enclosure defining a stepped cylinder bore and a step configured servo powered valve supported in the bore for reciprocal movement therein, both the servo powered valve and stepped cylinder bore having corresponding large and small dimensions to permit reciprocal movement of the stepped servo valve within the stepped cylinder bore; the valve means having an inlet opening in spaced relation to a portion of the servo powered valve, whereas relative movement of the portion of the servo powered valve regulate coolant flow through the valve means; the housing enclosure defining a servo valve control chamber formed about an end of the servo powered valve; a servo control passage extending between the servo control chamber and the lower pressure inlet of the pump means; an electrically activated valve for selectively regulating and even blocking coolant flow through the servo control passage; fluid connecting means extending between the engine coolant jacket and the control chamber so that the control chamber is always open to at least a small flow of relatively high pressure coolant from the coolant jacket; an electronic control unit generating an output for transmittal to the electrically activated valve in response to several engine operational parameters for controlling operation of this valve in regulating coolant flow through the servo control passage and resultantly in generating a coolant pressure control level in the control chamber whereby the servo powered valve is moved relative to the inlet in response to the control chamber pressure for permitting desired coolant flow therethrough from the engine coolant jacket to the radiator.

2. A cooling system for an internal combustion engine using a liquid coolant within an engine coolant jacket where it receives heat from the engine to be subsequently transferred to the atmosphere, comprising: a radiator fluidly connected to the coolant jacket for receiving coolant therefrom, for transferring heat to air flowing therethrough and for returning cooled coolant back to the coolant jacket; pump means having a pressurized inlet and a higher pressurized outlet for passing coolant from the coolant jacket to the radiator and subsequently back into the coolant jacket; fluid valve means between the coolant jacket and the radiator for regulating the coolant flow therebetween, the valve means including a hollow housing enclosure defining a stepped cylinder bore; a step configured servo powered valve supported in the step configured cylinder bore for reciprocal movements therein, both the step configured servo powered valve and cylinder bore having corresponding large and small diameter dimensions to permit said reciprocal movement; the housing enclosure defining an inlet opening and an outlet opening for coolant flow between the coolant jacket and the radiator; a portion of the small diameter portion of the servo powered valve being supported adjacent to the inlet opening so that reciprocation of the servo powered valve changes the spacing and resultantly the restriction to the coolant flow through the inlet opening; the housing enclosure forming a servo valve control chamber about an end of the servo powered valve; a servo control passage extending between the control chamber and the lower pressure pump inlet; an electrically activated valve for selectively regulating and even blocking coolant flow through the servo control passage; a bleed orifice through the small diameter portion of the servo powered valve and located so as to always communicate the control chamber with the engine coolant jacket; an electronic control unit generating an output for transmittal to the electrically activated valve in response to several engine operational parameters for controlling operation of this valve in regulating coolant flow through the servo control passage and resultantly in generating a coolant pressure level in the control chamber whereby the servo powered valve is moved relative to the inlet in response to the control chamber pressure for producing desired coolant flow therethrough from the engine coolant jacket to the radiator.

3. The cooling system of either of claims 1 or 2 in which the frequency of the output signal of the electronic control unit is varied to control the electrically activated valve.

4. The cooling system of either of claims 1 or 2 in which the servo control valve has at least one member movable by an electrically activated solenoid to restrict coolant flow through the servo control passage.

5. The cooling system of either of claims 1 or 2 in which the electronic control unit generates more than one output for control purposes other than for said servo powered valve.

6. The cooling system of either of claims 1 or 2 in which the electronic control unit receives a signal indicative of at least the following conditions relating to engine operation and cooling: ambient temperature, engine coolant outlet temperature, engine coolant inlet temperature, combustion chamber temperature and manifold pressure.

\* \* \* \* \*